United States Patent
Kubota et al.

(10) Patent No.: US 10,849,026 B2
(45) Date of Patent: Nov. 24, 2020

(54) METHOD AND APPARATUS OF UPLINK AND DOWNLINK BASED HANDOVER

(71) Applicant: QUALCOMM Incorporated, San Diego, CA (US)

(72) Inventors: Keiichi Kubota, San Diego, CA (US); Gavin Bernard Horn, La Jolla, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/591,253

(22) Filed: May 10, 2017

(65) Prior Publication Data

US 2017/0332283 A1  Nov. 16, 2017

Related U.S. Application Data

(60) Provisional application No. 62/336,568, filed on May 13, 2016.

(51) Int. Cl.
*H04W 36/00* (2009.01)
*H04W 36/08* (2009.01)
*H04W 72/04* (2009.01)

(52) U.S. Cl.
CPC ... *H04W 36/0016* (2013.01); *H04W 36/0058* (2018.08); *H04W 36/0085* (2018.08);
(Continued)

(58) Field of Classification Search
CPC ......... H04W 36/0016; H04W 36/0085; H04W 36/0058; H04W 36/08; H04W 72/0413; H04W 72/042
See application file for complete search history.

(56) References Cited

U.S. PATENT DOCUMENTS

2007/0015511 A1* 1/2007 Kwun ............... H04W 36/30
                                                                    455/436
2009/0028112 A1* 1/2009 Attar ............... H04W 36/245
                                                                    370/332
(Continued)

FOREIGN PATENT DOCUMENTS

EP  2262318 A1 * 12/2010 ........ H04W 36/0088
EP  2262318 A1    12/2010
(Continued)

OTHER PUBLICATIONS

International Search Report and Written Opinion—PCT/US2017/032166—ISA/EPO—dated Jul. 19, 2017.
(Continued)

*Primary Examiner* — Ivan O Latorre
(74) *Attorney, Agent, or Firm* — Robert A. Reid; Patterson +Sheridan, L.L.P.

(57) ABSTRACT

Aspects of the present disclosure provide apparatus and techniques that may be applied in systems that may help enable efficient communication between a base station (BS) and certain devices, such as wearable devices and/or machine type communication (MTC) user equipments (UEs), having a single receiver (RX) for long term evolution (LTE). An exemplary method, performed by a BS, generally includes receiving, from a UE, an indication of a category of the UE, wherein the category of the UE indicates at least one of: a maximum throughput supported by the UE or a number of layers supported by the UE; assuming a number of receivers at the UE based on the category of the UE; determining one or more transmit parameters based on the number of receivers of the UE; and communicating with the UE according to the one or more transmit parameters.

18 Claims, 12 Drawing Sheets

(52) U.S. Cl.
CPC ......... *H04W 36/08* (2013.01); *H04W 72/042* (2013.01); *H04W 72/0413* (2013.01)

(56) References Cited

U.S. PATENT DOCUMENTS

| | | | | |
|---|---|---|---|---|
| 2012/0093128 | A1* | 4/2012 | Song | H04W 36/30 370/331 |
| 2013/0016841 | A1* | 1/2013 | Fong | H04W 72/0413 380/287 |
| 2013/0310037 | A1* | 11/2013 | Ji | H04L 5/0091 455/436 |
| 2015/0208263 | A1* | 7/2015 | Behravan | H04W 24/10 370/252 |
| 2015/0282036 | A1* | 10/2015 | Yi | H04L 5/001 370/332 |
| 2016/0037425 | A1* | 2/2016 | Van Lieshout | H04B 7/024 370/332 |
| 2016/0337952 | A1* | 11/2016 | Li | H04W 72/0466 |
| 2017/0064587 | A1* | 3/2017 | Xu | H04W 36/0094 |
| 2017/0230985 | A1* | 8/2017 | Yamada | H04L 5/0051 |
| 2018/0007574 | A1* | 1/2018 | Park | H04W 72/042 |

FOREIGN PATENT DOCUMENTS

| | | | | |
|---|---|---|---|---|
| EP | 2725845 | A1 * | 4/2014 | ........... H04W 24/10 |
| EP | 2725845 | A1 | 4/2014 | |
| EP | 2882213 | A1 | 6/2015 | |
| EP | 3122108 | A1 | 1/2017 | |
| WO | WO-2015080645 | A1 * | 6/2015 | ............. H04B 7/088 |
| WO | 2015141829 | A1 | 9/2015 | |

OTHER PUBLICATIONS

Qualcomm Europe: "Uplink Channel Measurements in Neighboring Cells," 3GPP Draft; R2-073301. 3rd Generation Partnership Project (3GPP). Mobile Competence Centre ; 650. Route Des Lucioles ; F-06921 Sophia-Antipolis Cedex ; France. vol. RAN WG2 No. Athens. Greece; Aug. 15, 2007. Aug. 15, 2007 (Aug. 15, 2007). XP050136017. [retrieved on Aug. 15, 2007].

* cited by examiner

METHOD AND APPARATUS OF UPLINK AND DOWNLINK BASED HANDOVER

CLAIM OF PRIORITY UNDER 35 U.S.C. § 119

The present application for patent claims benefit of U.S. Provisional Patent Application Ser. No. 62/336,568, filed May 13, 2016, assigned to the assignee hereof and hereby expressly incorporated by reference herein.

BACKGROUND

Field of the Disclosure

Certain aspects of the present disclosure generally relate to wireless communications and, more particularly, to methods and apparatus for uplink-based cell selection.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there may exist a need for further improvements in LTE technology. These improvements could be applicable to other multi-access technologies and the telecommunication standards (e.g., 5G) that employ these technologies.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide techniques for uplink and downlink based handover.

Certain aspects of the present disclosure provide a method for wireless communications by a user equipment (UE). The method generally includes receiving one or more downlink (DL) reference signals from one or more transmission reception points (TRPs) in a wireless communications network, measuring the one or more DL reference signals, transmitting, to the one or more TRPs, a first measurement report based on the measured one or more DL reference signals, transmitting, to the one or more TRPs, an uplink (UL) reference signal, and receiving a request to handover from one or more serving TRPs to another one or more TRPs wherein a handover request is based on, at least in part, the UL reference signal and the first measurement report transmitted to the one or more TRPs.

Certain aspects of the present disclosure provide a method for wireless communications by a transmission reception point (TRP). The method generally includes transmitting, to a user equipment (UE), downlink (DL) reference signals, receiving, from the UE, a first measurement report based on measurements of the one or more DL reference signals, receiving, from the UE, an uplink (UL) reference signal, and transmitting a request for the UE to handover from one or more serving TRPs to another one or more TRPs based, at least in part, on the UL reference signal and the first measurement report.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
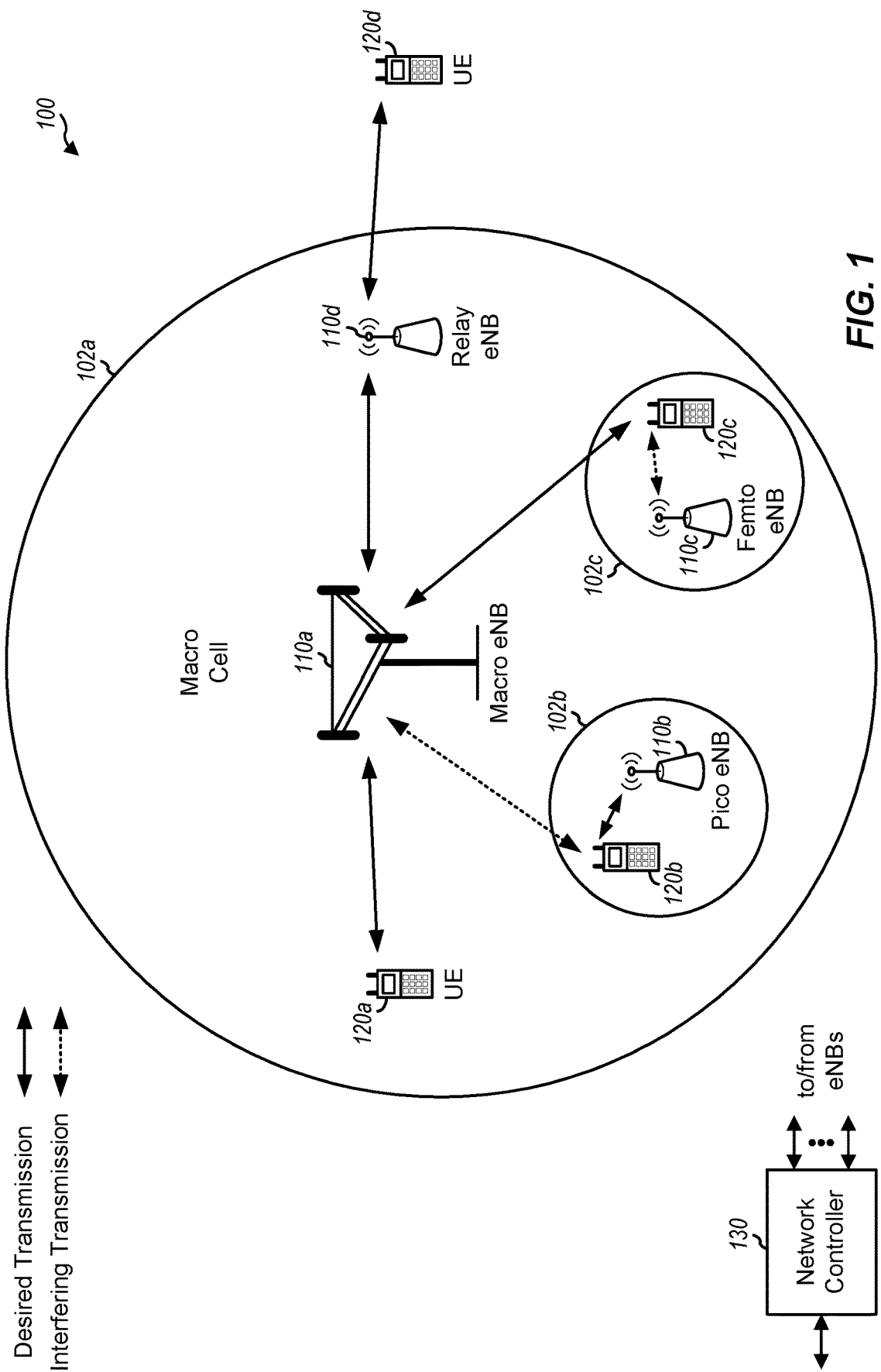
FIG. 1 is a block diagram conceptually illustrating an example of a wireless communication network, in accordance with certain aspects of the present disclosure.

Aspects of the present disclosure provide techniques that may uplink and downlink based handover.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communications System

FIG. 1 illustrates an example wireless communication network 100, in which aspects of the present disclosure may be practiced. For example, techniques presented herein may be used to help user equipments (UEs) and base stations (BSs) shown in FIG. 1 communicate. For example, a eNB 110 may receive an indication of UE-Category from a UE 120 and assume a number of number of receivers at the UE 120 based on the UE-Category indicated. The eNB 110 may then determine transmit parameters based on the number of receivers at the UE 120 to use for communicating with the UE 120.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In aspects, the UE may include an MTC device or a wearable device. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
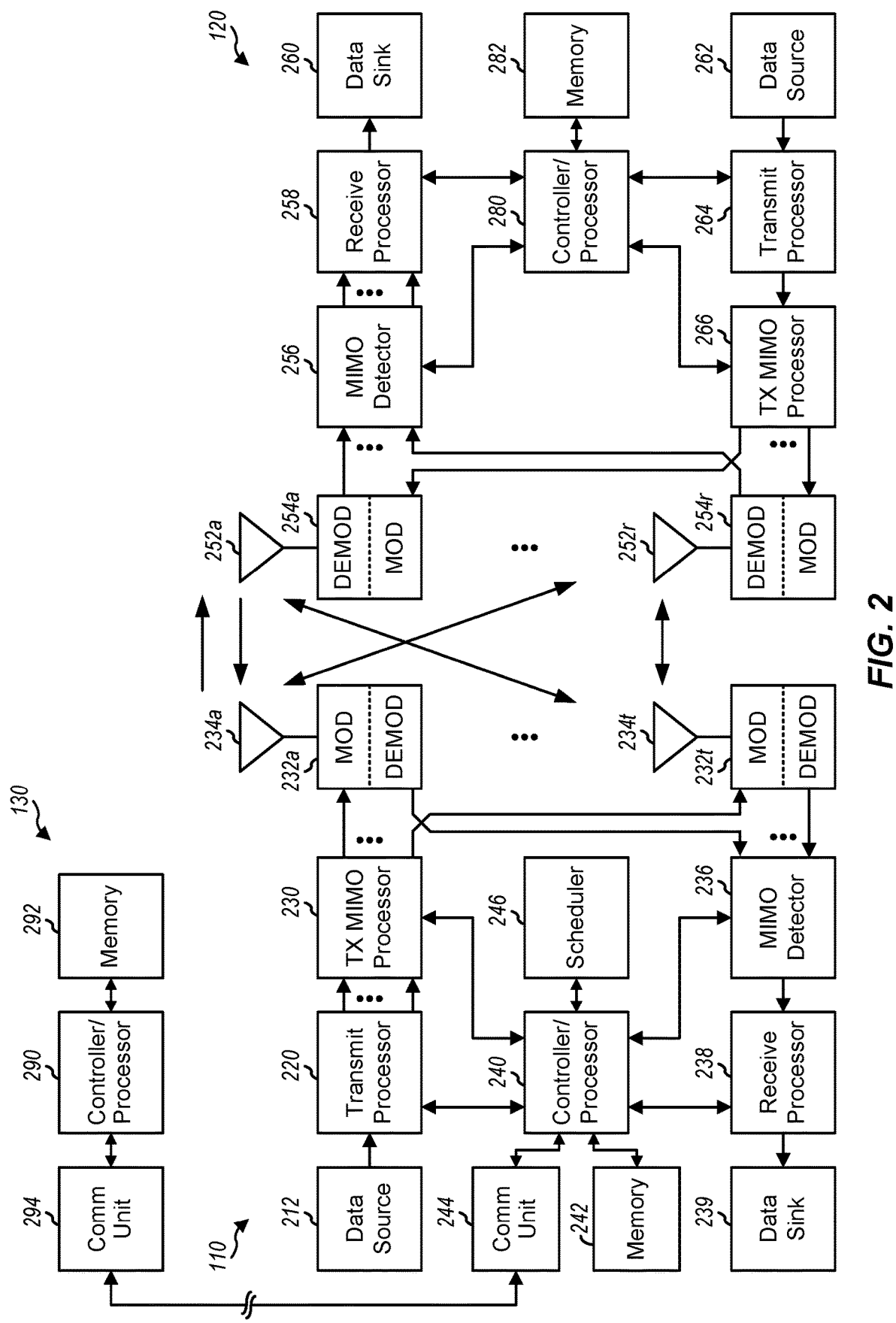
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs shown in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports including RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, controller/processor 240 and/or other processors and modules at base station 110 may perform direct operations 700 shown in FIG. 7. Similarly, controller/processor 280 and/or other processors and modules at UE 120, may perform or direct operations 500 shown in FIG. 5. Memories 242 and 282 may store data and program codes for base station 110 and UE 120, respectively. A scheduler 246 may schedule UEs for data transmission on the downlink and/or uplink. In some aspects, one or more of the components shown in FIG. 2 may be employed to perform example processes 600, 700 and/or other processes for the techniques described herein.

Figure 3:
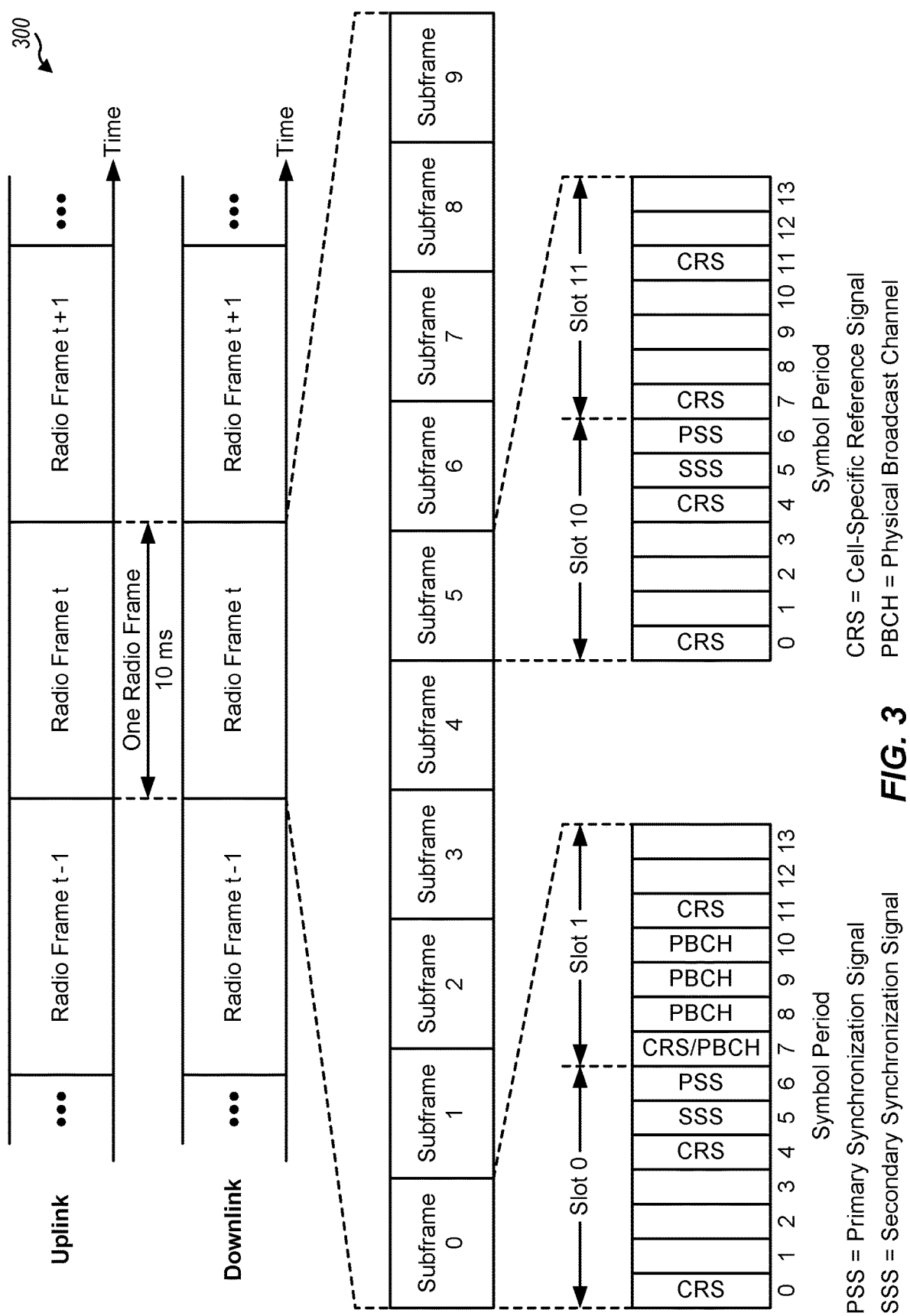
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames (e.g., as shown in FIG. 3, radio frames t−1, t, t−1, . . . ). Each radio frame may have a predetermined duration (e.g., 10 milliseconds (ms)) and may be partitioned into 10 subframes with indices of 0 through 9 (e.g., as shown in FIG. 3, radio frame t is partitioned into subframe 0 through subframe 10). Each subframe may include two slots. Each radio frame may thus include 20 slots with indices of 0 through 19 (e.g., as shown in FIG. 3, subframe 0 includes slot 0 and slot 1 and subframe 5 includes slot 10 and slot 11). Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1 (e.g., as shown in FIG. 3, slot 0 includes symbols 0-6, slot 1 includes symbols 7-13, slot 10 includes symbols 0-6, and slot 11 includes symbols 7-13).

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. In aspects, one or more of the above-described signals and/or channels may be transmitted in a different time and/or frequency resource.

Figure 4:
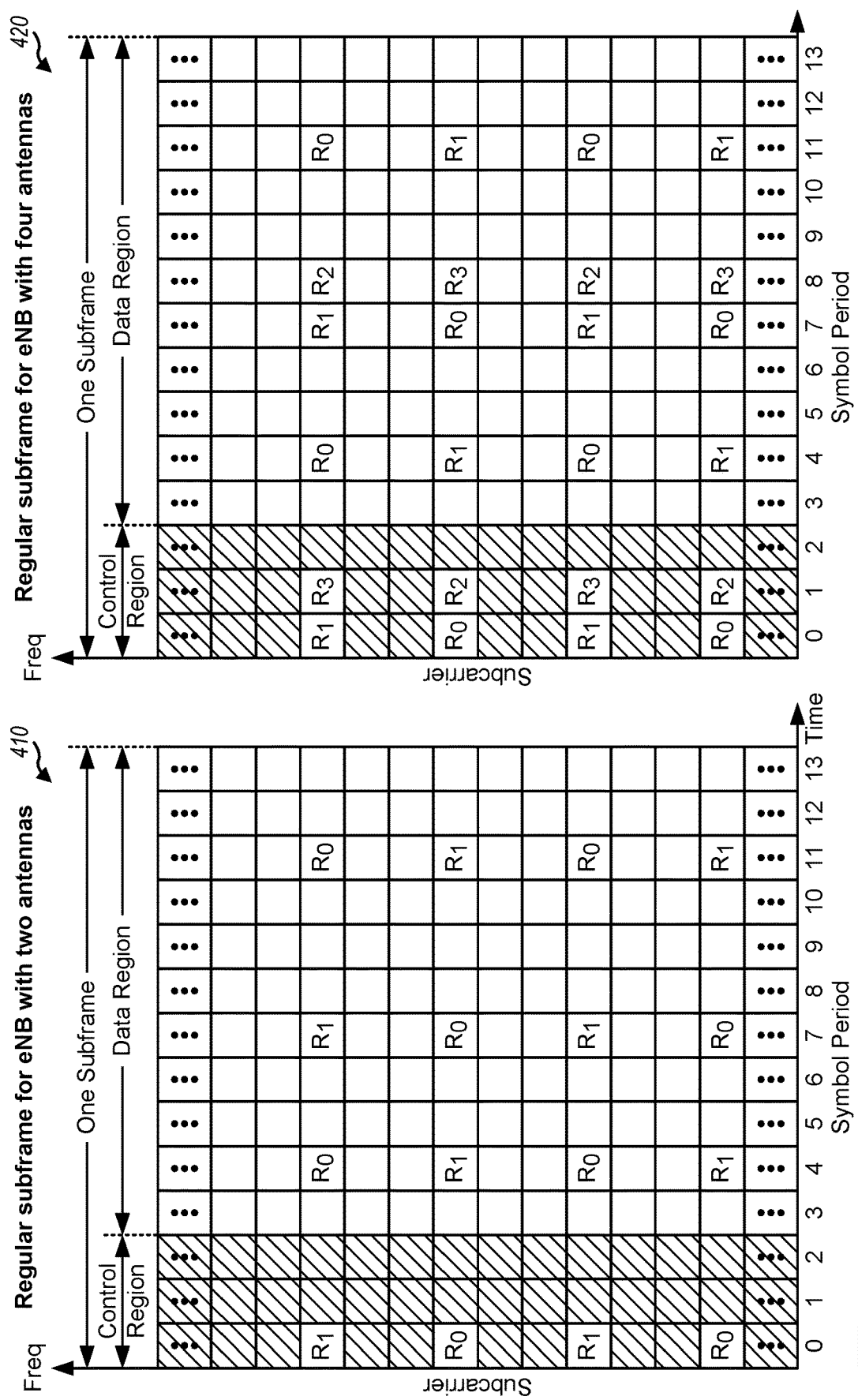
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 4A:
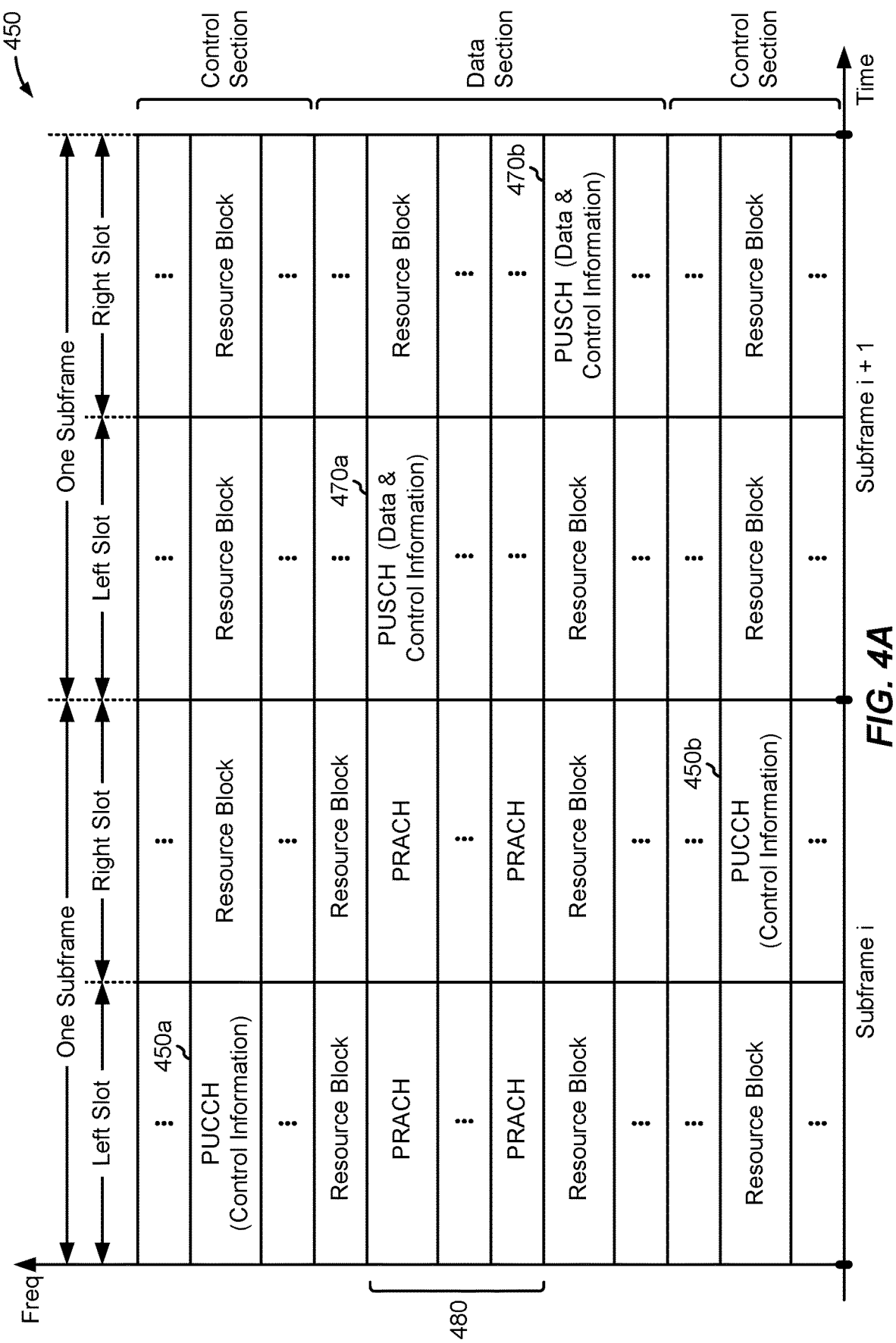
FIG. 4A is a diagram illustrating an example of an uplink (UL) frame structure in LTE, in accordance with certain aspects of the present disclosure.

FIG. 4A is a diagram illustrating an example of an uplink (UL) frame structure 450 in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 450a, 450b in the control section to transmit control information to an eNB. The UE may also be assigned resource blocks 470a, 470b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 480. The PRACH 480 carries a random sequence and may not carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE may make a single PRACH attempt per frame (e.g., of 10 ms). In aspects, one or more of the above-described signals and/or channels may be transmitted in a different time and/or frequency resource.

As indicated above, FIGS. 4 and 4A are provided as examples. Other examples are possible and may differ from what was described above in connection with FIGS. 4 and 4A.

After system access by a UE to a first eNB, a UE may monitor and take measurements (e.g. SINR, RSRQ) of the first eNB along with neighboring eNBs so the UE may reselect or handover to a neighboring cell. For example, as a UE moves from the coverage area of the first eNB into the coverage area of a neighboring eNB, the UE or RAN may decide to perform handover or cell reselection to the neighboring eNB based, at least in part, on the measurements made by the UE. These measurements are performed on signals transmitted by one or more eNBs and received by the UE and provide an indication of the DL channel quality. That is, in legacy systems (e.g., GSM, WCDMA, HSPA, and LTE) DL channel quality is considered as a part of cell reselection and UL channel quality is not taken into account.

A new air interface is being introduced for 5G, including features that include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, and low-density parity check (LDPC).

In 5G, different use cases may require URLLC (e.g., for industry automation deployment). For URLLC, a user equipment (UE) has to ensure a radio link having sufficient uplink and downlink channel quality may be established towards the target cell (e.g., a target reception point (TRP)) prior to a serving cell change. In the present disclosure, the terms TRP, cell, base station, nodeB (NB), eNodeB (eNB), next generation Node B (gNodeB or gNB), and distributed unit (DU) may be used interchangeably. However, existing mobility procedures used in legacy mobile communication systems, such as LTE, take into account only downlink channel quality but not uplink channel quality.

Therefore it may be desirable to have techniques designed to improve reliability of cell selection to ensure that a UE is capable of transmitting on the uplink in addition to receiving on the downlink upon mobility.

Example Uplink and Downlink Based Handover

Figure 5:
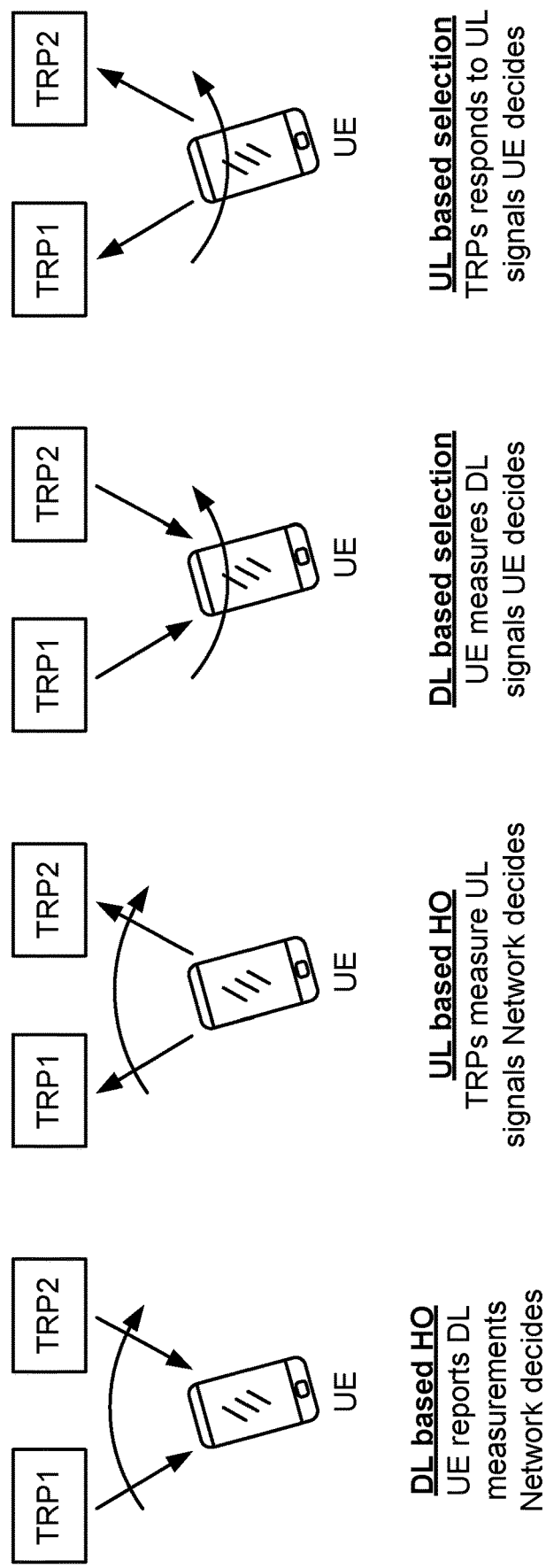
FIG. 5 illustrates various mobility combinations, in accordance with aspects of the present disclosure.

FIG. 5 illustrates various mobility scenarios that may be addressed by various aspects of the present disclosure. In 5G systems, mobility while in connected mode may be considered to encompass four general mobility combinations.

As shown in FIG. 5, these combinations may be based in part on whether the UE or the RAN determines that the UE should switch from one eNB to another eNB. A reselection occurs where the UE makes the determination and a handover occurs where the RAN makes the determination. The determination of whether to handover or reselect may also occur based on measurements made on a DL or UL reference signal.

For example, a DL based handover may include a UE reporting DL measurements (of DL reference signals from multiple TRPs/base stations) and the network deciding on a handover target based on at least the DL measurements. A UL based handover may include TRPs measuring UL reference signals and the network deciding on a handover target based on at least the measured UL signals. A DL based reselection may include the UE measuring DL reference signals and then deciding on a target for reselection based on the measured DL signals. Further, a UL based reselection may include TRPs providing feedback regarding UL signals and the UE deciding on a target for reselection based on at least the feedback from the TRPs.

Figure 6:
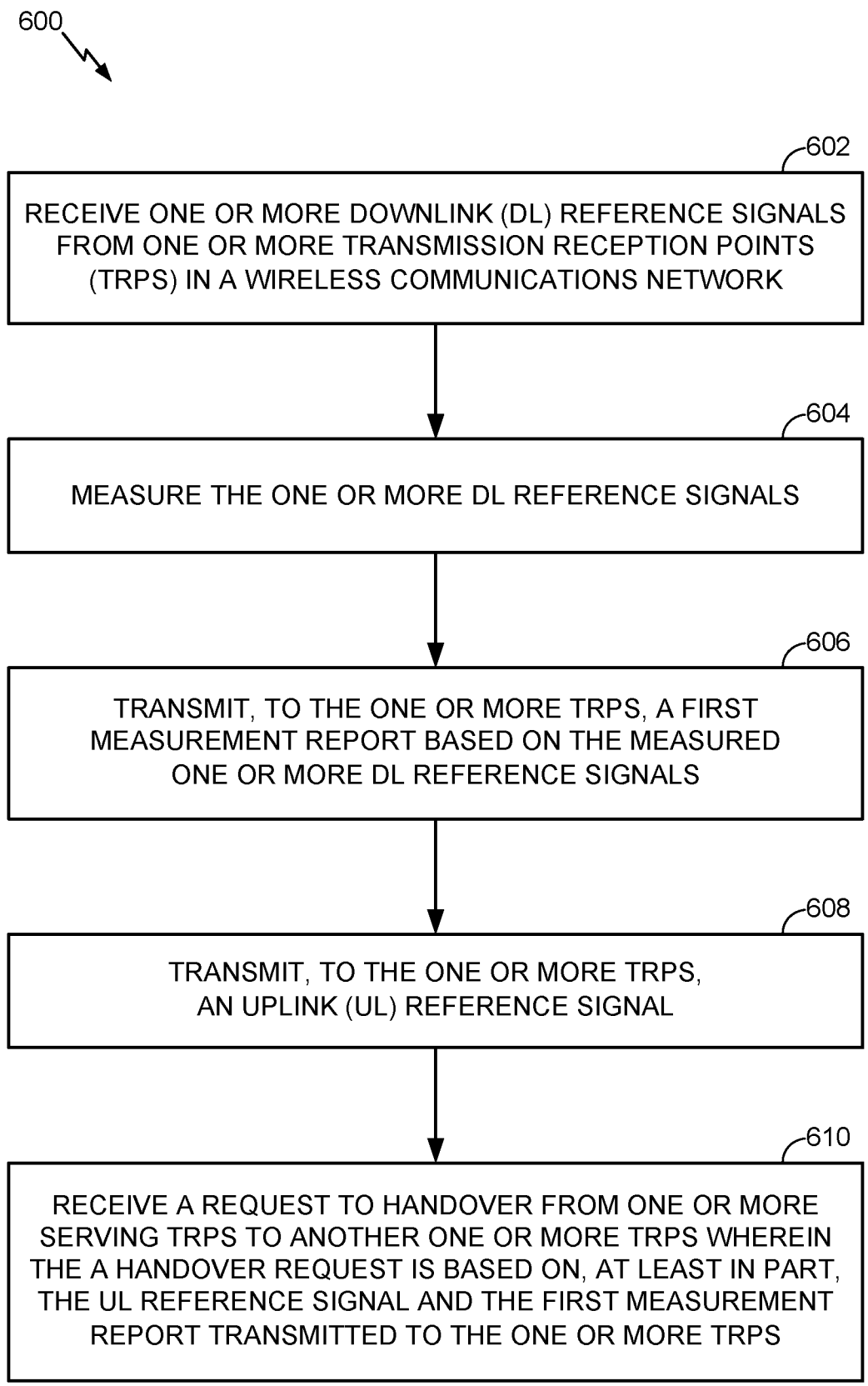
FIG. 6 illustrates example operations 600 for wireless communications, in accordance with certain aspects of the present disclosure.

FIG. 6 illustrates example operations 600 for wireless communications, in accordance with certain aspects of the present disclosure. According to certain aspects, operations 600 may be performed by a user equipment (e.g., UE).

Operation 600 begin, at 602, by receiving one or more downlink (DL) reference signals from one or more transmission reception points (TRPs) in a wireless communications network. At 604, the UE measures the one or more DL reference signals. The measured DL reference signals may be, for example, channel state information reference signal (CSI-RS), synchronization signals (SS, such as new radio or NR-SS), or any other type of measurement reference signals (MRS).

At 606, the UE transmits, to one or more of the TRPs, a first measurement report based on the measured one or more DL reference signals. At 608, the UE transmits, to one or more of the TRPs, an uplink (UL) reference signal. At 610, the UE receives a request to handover from one or more serving TRPs to another one or more TRPs wherein a handover request is based on, at least in part, the UL reference signal and the first measurement report transmitted to the one or more TRPs.

Figure 7:
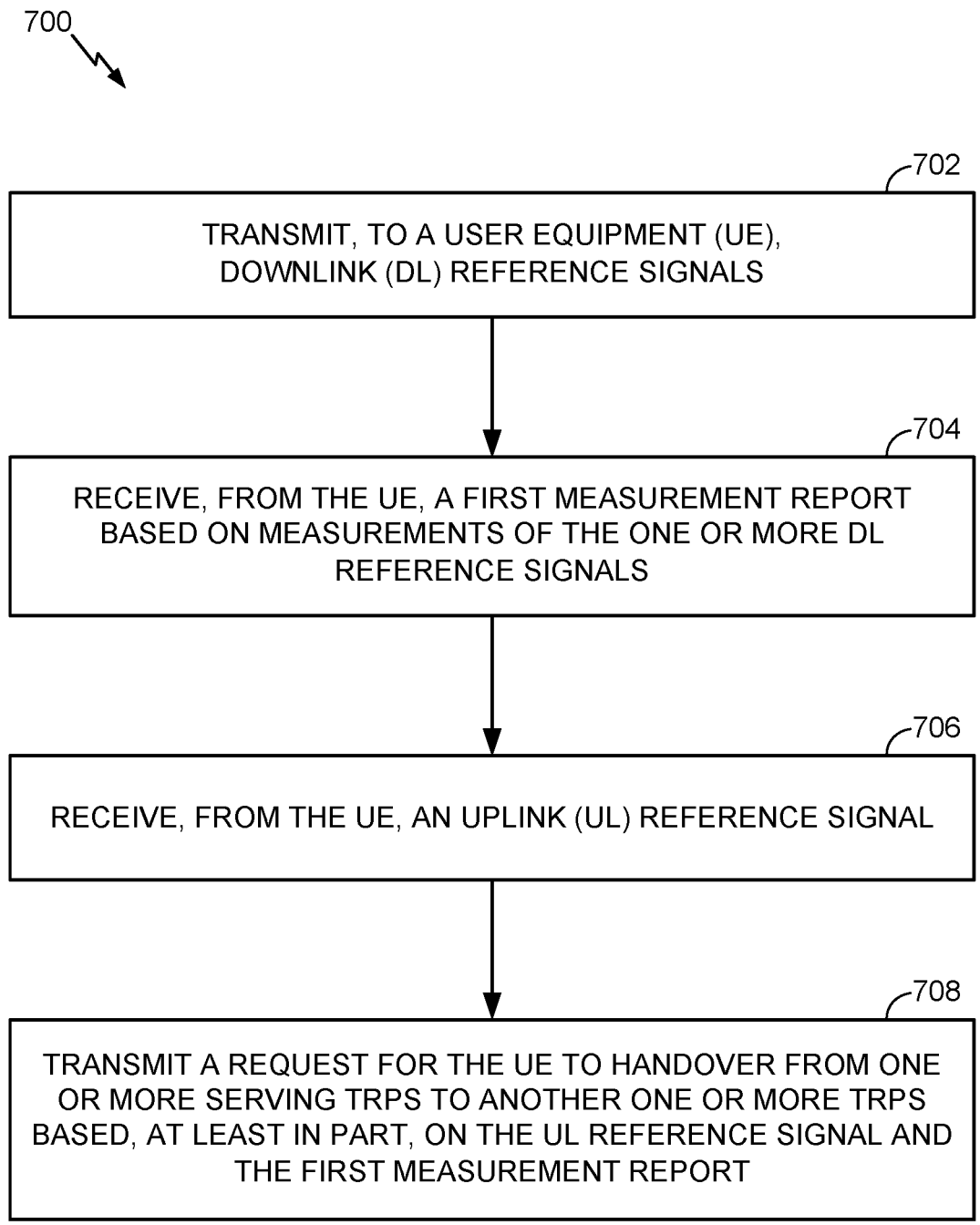
FIG. 7 illustrates example operations 700 for wireless communications, in accordance with certain aspects of the present disclosure.

FIG. 7 illustrates example operations 700 for wireless communications, in accordance with certain aspects of the present disclosure. According to certain aspects, operations 700 may be performed by a transmission reception point (TRP), such as ae eNB, gNB, or other type of TRP or base station.

Operations 700 begin, at 702, by transmitting, to a user equipment (UE), downlink (DL) reference signals. At 704, the TRP receives, from the UE, a first measurement report based on measurements of the DL reference signals. At 706, the TRP receives, from the UE, an uplink (UL) reference signal. At 708, the TRP transmits a request for the UE to handover from one or more serving TRPs to another one or more TRPs based, at least in part, on the UL reference signal and the first measurement report.

For example, according to one or more aspects of the present disclosure, a radio access network (RAN) may be provided that makes a decision to hand over a UE from a serving eNB to another eNB based on DL as well as UL measurements. A UE may be configured, by a RAN to transmit an UL reference signal to one or more eNBs while operating in a connected state (e.g., an RRC_CONNECTED_DEDICATED or RRC_CONNECTED_COMMON state).

This UL reference signal may be received and the UL channel quality, signal strength, or some other parameter, may be measured by the one or more eNBs. The RAN may also configure the UE to report measurements of the DL reference signals received by the UE via an UL message. The RAN may determine a target eNB for the UE to handover to based, at least in part, on the UL reference signal and the DL measurement report.

Figure 8A:
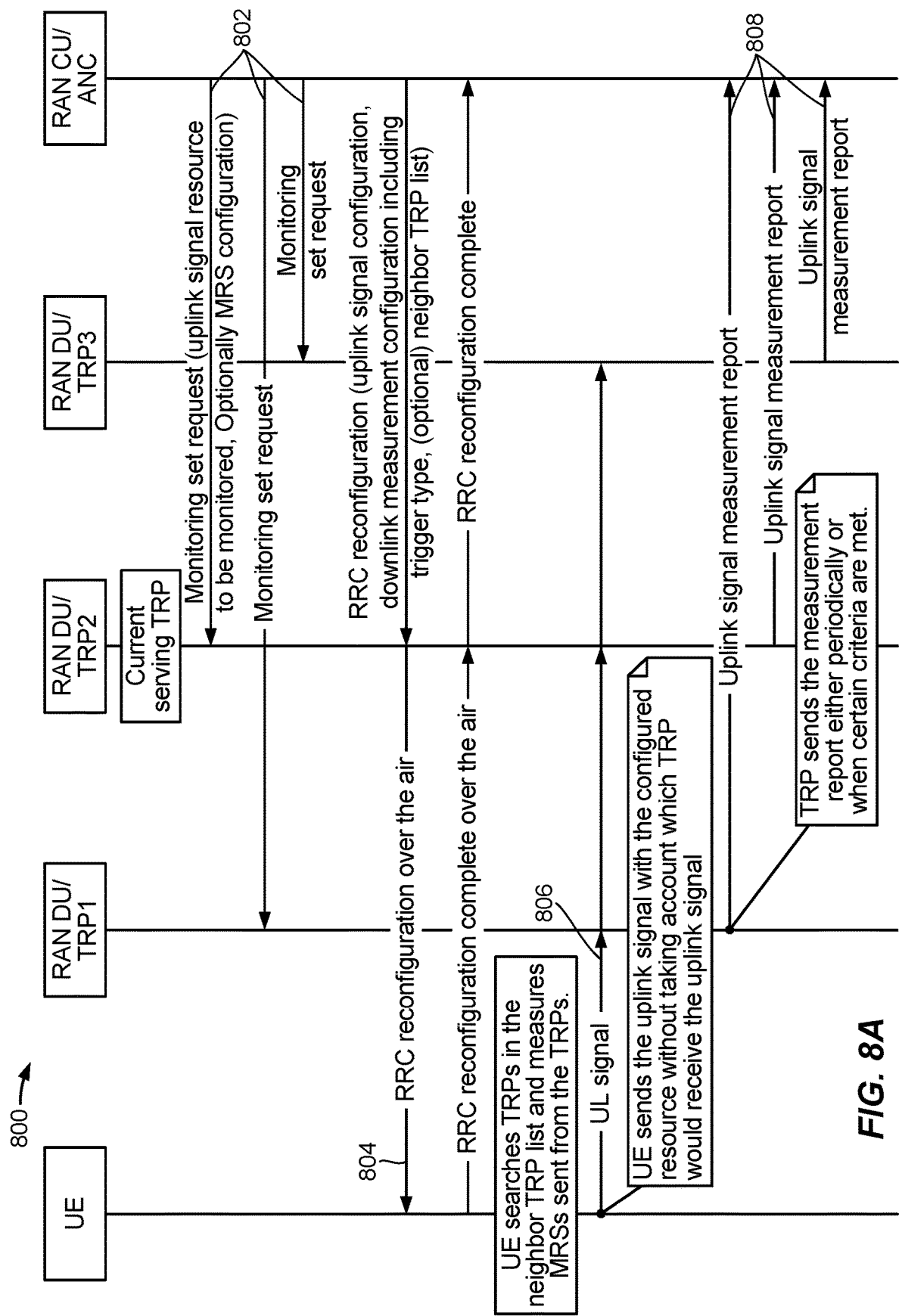
FIGS. 8A and 8B illustrate an example call-flow diagram 800 for uplink based cell handover, according to aspects of the present disclosure.
Figure 8B:
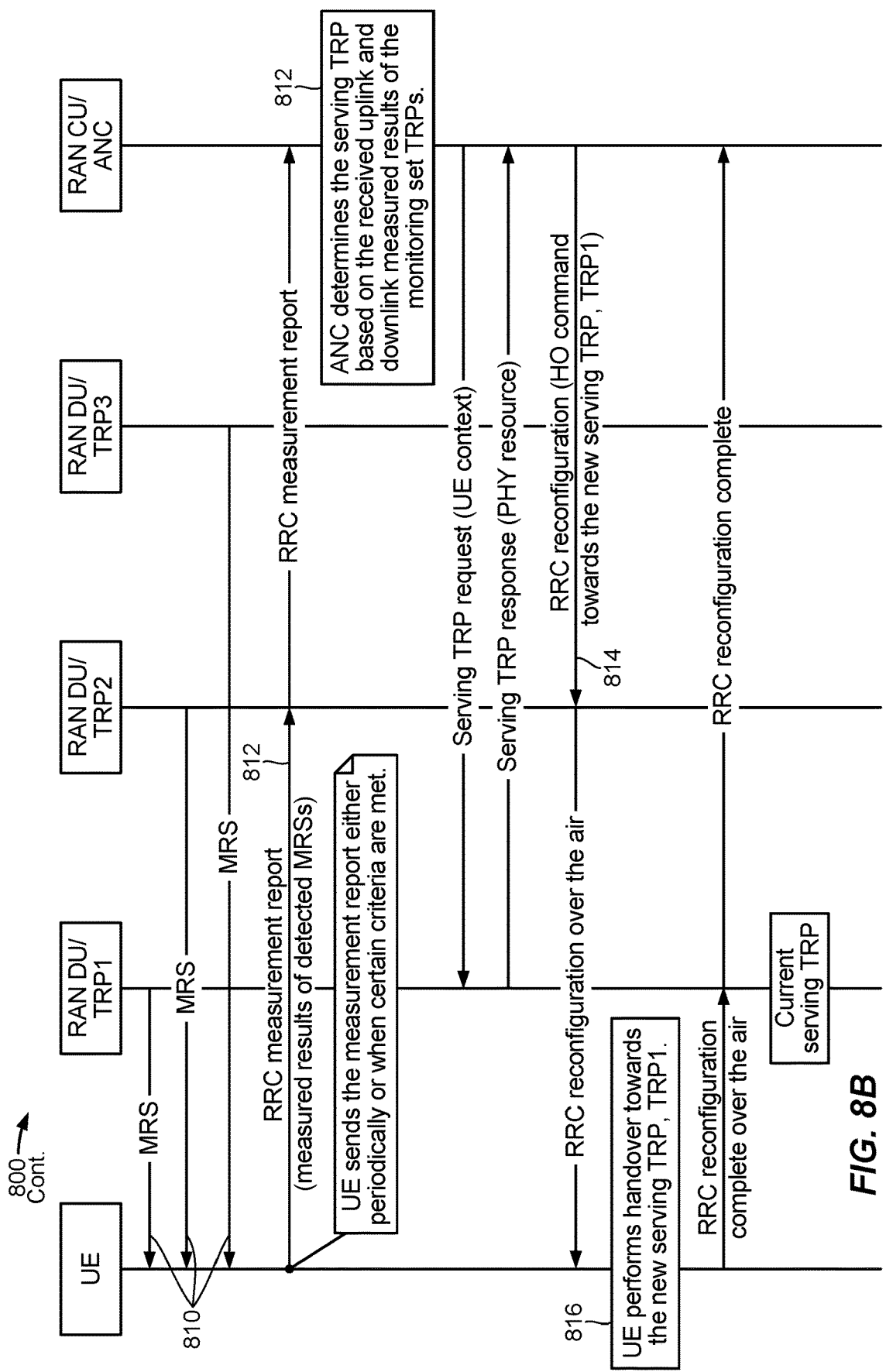

FIGS. 8A and 8B illustrate an example call-flow diagram 800 for uplink based cell handover, according to aspects of the present disclosure. As shown in FIGS. 8A and 8B, a RAN may include a set of one or more distributed TRPs which may utilize and advertise a global TRP ID. The TRPs may be connected to one or more network entities such as, for example, an access node controller (ANC) for RAN sharing, radio as a service (RAAS), or for deployment requirements. A network entity may, in addition to services performed by non-ANC TRPs, function to terminate backhaul interfaces to the gateway, central network, and any other type of network entities. In the present disclosure, the terms ANC, centralized unit (CU), base station, nodeB (NB), eNodeB (eNB), next generation Node B (gNodeB or gNB) may be used interchangeably.

In some cases, a RAN, from a serving TRP, may configure the UE to measure one or more DL reference signals and transmit an UL reference signal simultaneously so the RAN can make an immediate handover decision based on the UL and DL measurements. According to one or more cases, the UL reference signal may be transmitted in response to determining measurements of the one or more DL reference signals satisfy one or more criteria. The RAN, at 802, may configure the current serving TRP and the neighboring TRPs of the current serving TRP to monitor for uplink signals the UE is configured to send. The TRPs monitoring the uplink signal may be referred to as a TRP monitoring set.

At 804, the TRP transmits to the UE, handover configuration information. This handover configuration information may contain DL configuration information configuring the UE to measure DL reference signals. In configuring the UE to measure the DL reference signals, the RAN may specify to the UE a measurement reporting trigger indicating when to perform DL measurement reporting.

This trigger may be periodic, or event based, and may indicate reporting criteria, such as which measurement events (e.g., LTE A1, . . . A5, B1, etc., as specified in TS 36.331). The DL measurement configuration may also include a neighbor TRP list (NTL) including one or more TRP neighbors of the current serving TRP.

The handover configuration information may also contain UL reference signal configuration information. In the UL reference signal configuration, the RAN may indicate to the UE to transmit UL reference signal using specific resources (e.g., a random access procedure (RACH), sounding reference signal (SRS)). The RAN may also indicate when to transmit the UL reference signals, such as based on a periodicity, or based on detection of a triggering event (e.g., event triggered), for example, triggering an UL reference signal transmission when a DL measurement report is sent.

At 806, the UE may send one or more UL reference signals based on the based on the UL reference signal configuration received in 804 to one or more TRPs of the TRP monitoring set. The TRPs of the TRP monitoring set receive the UL reference signal and at 808, the TRP monitoring set may perform measurements, such as signal strength or signal quality, on the received UL reference signal. The TRP monitoring set may transmit these measurements to the ANC in an UL measurement report. The UL measurement report may be sent by the TRP monitoring set to the ANC periodically, or when certain criteria are met (e.g., event triggered), based on the configuration received by the TRP monitoring set at step 802.

At 810, the serving and neighboring TRPs may send one or more DL reference signals to the UE. As noted above, the DL reference signals may be, CSI RS, SS, and/or any other type of measurement reference signals (MRS), to the UE. In some cases, the one or more DL reference signals may include a transmission reception point identifier (TRP-ID) identifying the TRP. The one or more DL reference signals may be continuously sent periodically based on scheduling information that includes a separately defined schedule.

The UE may receive the one or more DL reference signals from the serving TRP, along with one or more DL reference signals from neighboring TRPs. The UE, at 812, performs measurements (e.g., SINR, RSRQ) of the one or more DL reference signals based on the DL configuration information received at 804 and transmits a DL measurement report related to the measurements to the serving TRP. The DL measurement report may contain measurement information related to the serving TRP along with measurement information related to neighboring TRPs. The serving TRP may forward the DL measurement report to the network entity. The DL measurement report may be sent to the network entity periodically, or when certain criteria are met (e.g., event triggered), based on the DL configuration information received at step 804.

At 812, the network entity may determine a new serving (target) TRP based on the UL and DL measurement reports received from the TRPs. The network entity may initiate handover procedures and send to the target TRP information related to handing over the UE. At 814, the network entity transmits to the serving TRP a handover message indicating the target TRP and the serving TRP forwards this handover message to the UE. At 816, the UE performs a handover towards the target TRP indicated in the handover message.

In some cases, a RAN, upon reception of a DL measurement report from the UE, may configure the UE to transmit an UL reference signal. This allows the network to limit the number of monitoring set TRPs monitoring for UL signals from UEs and allows UE to transmit UL reference signals when the DL signal quality is good enough for the UE to be able receive transmissions from the RAN. This also allows the UE to save battery power by reducing the uplink signal transmission time period as UL reference signals are sent on demand. The network entity may configure the monitoring set TRPs via a DL reference signal transmission based on measurement reports sent from the UE.

Figure 9A:
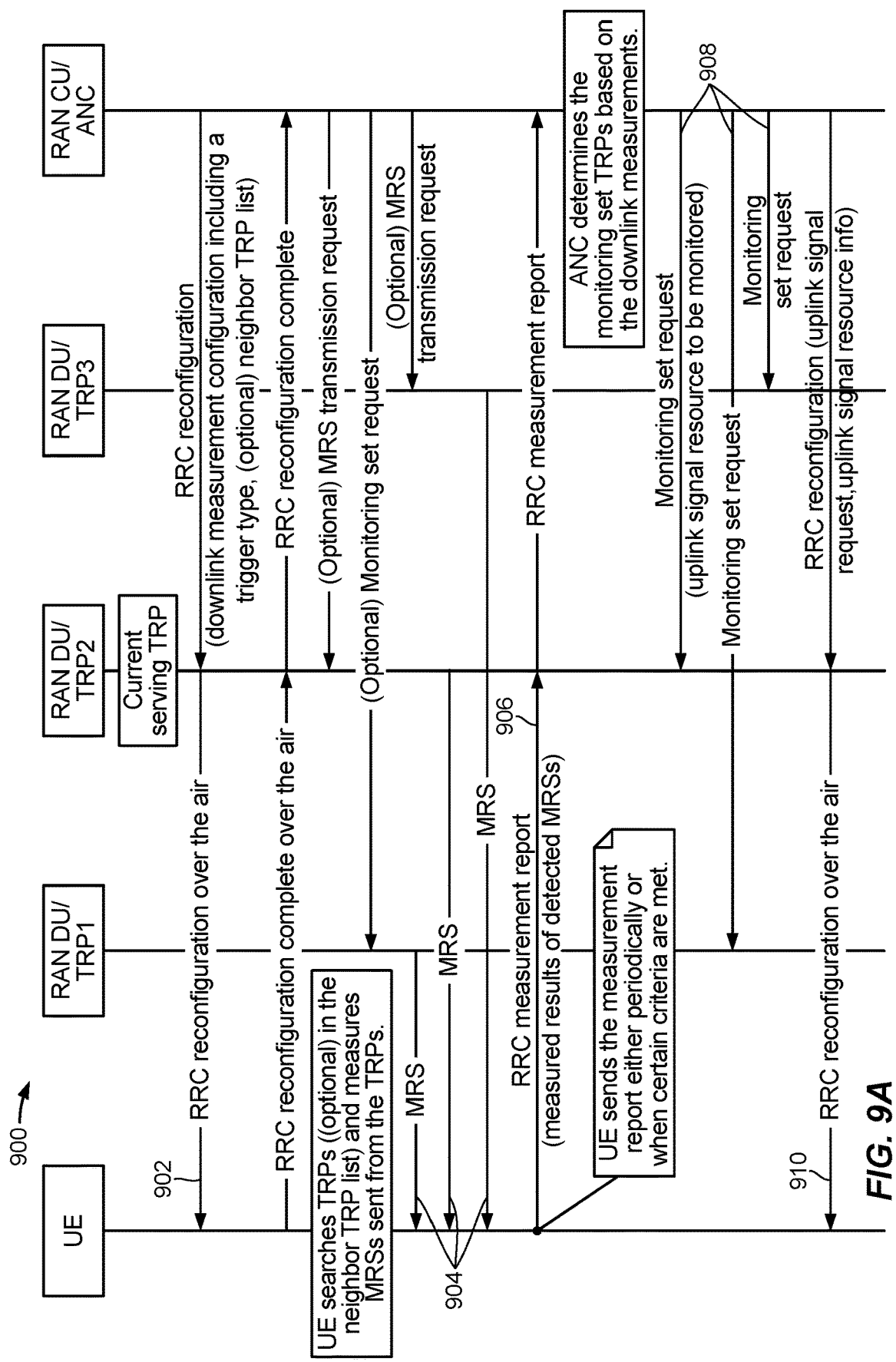
FIGS. 9A and 9B illustrate an example call-flow diagram 900 for uplink based cell handover, according to aspects of the present disclosure.
Figure 9B:
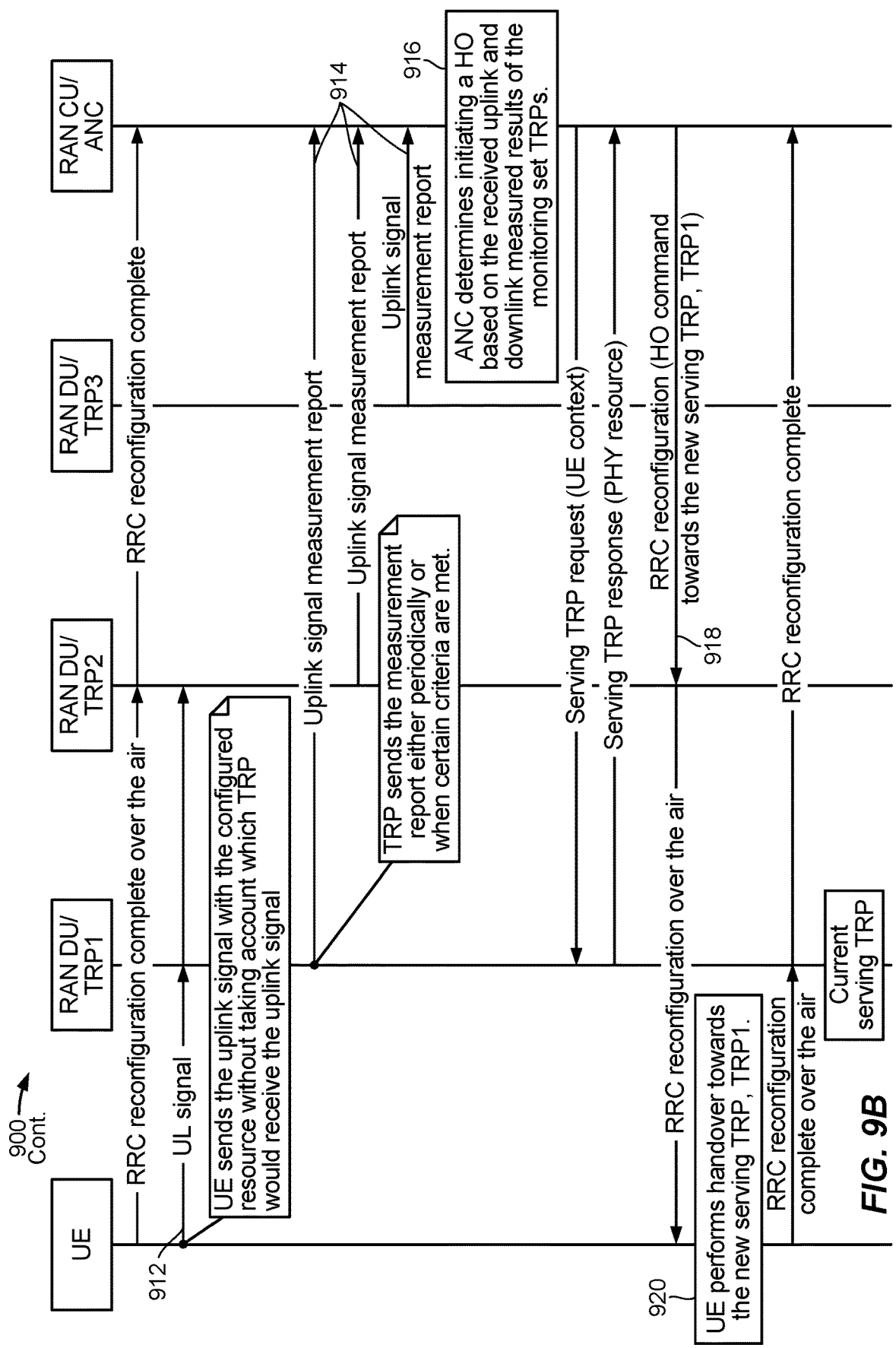

FIGS. 9A and 9B illustrate an example call-flow diagram 900 for uplink based cell handover, according to aspects of the present disclosure. At 902, the serving TRP transmits to the UE, DL configuration information configuring the UE to measure DL reference signals. The RAN may specify to the UE a measurement reporting trigger indicating when to perform DL measurement reporting. This trigger may be periodic, or event based, and may indicate reporting criteria, such as which measurement events (e.g., LTE A5, B1, etc., as specified in TS 36.331). The DL measurement configuration may also include a neighbor TRP list (NTL) including one or more TRP neighbors of the current serving TRP.

At 904, the serving and neighboring TRPs may send one or more DL reference signals to the UE. The reference signals may be continuously sent periodically based on a separately defined schedule. At 906, the UE performs measurements (e.g., SINR, RSRQ) of the reference signals based on the DL configuration information received at 902 and transmits the DL measurement report related to the measurements to the serving TRP, which may forward the DL measurement report to the network entity. The UE may receive the DL reference signals from the serving TRP, along with DL reference signals from neighboring TRPs. The DL measurement report may contain measurement information related to the serving TRP along with measurement information related to neighboring TRPs. The serving TRP may forward the DL measurement report to the network entity. The DL measurement report may be sent to the network entity periodically, or when certain criteria are met (e.g., event triggered).

The RAN, at 908, may configure the serving TRP, along with the TRP monitoring set, to monitor for uplink signals from the UE. The network entity may determine a TRP monitoring set based on the TRPs measured by the UE in the DL measurement report. At 910, the RAN may send to the UE UL reference signal configuration information to configure the UE to transmit UL reference signals. The UL reference signal configuration may indicate to the UE to transmit UL reference signal using specific resources (e.g., a random access procedure (RACH), sounding reference signal (SRS)). The RAN may also indicate when to transmit the UL reference signals, such as based on a periodicity, or based on detection of a triggering event (e.g., event triggered), for example, triggering an UL reference signal transmission when a DL measurement report is sent. At 912, the UE may send one or more UL reference signals based on the based on the UL reference signal configuration received in 910 to one or more TRPs of the TRP monitoring set.

At 914, the TRPs of the TRP monitoring set receive the UL reference signal and perform measurements, such as signal strength or signal quality, on the received UL reference signal. The TRP monitoring set may transmit these measurements to the network entity (e.g., ANC) in an UL measurement report. The UL measurement report may be sent by the TRP monitoring set to the network entity periodically, or when certain criteria are met (e.g., event triggered), based on the configuration received by the TRP monitoring set at step 908. At 916, the network entity may determine a new serving (target) TRP based on the UL and DL measurement reports received from the TRPs. The network entity may initiate handover procedures and send to the target TRP information related to handing over the UE. At 918, the network entity transmits to the serving TRP a handover message indicating the target TRP and the serving TRP forwards this handover message to the UE. At 920, the UE performs a handover towards the target TRP indicated in the handover message.

In some cases, a RAN may configure a TRP to transmit a DL reference signal in response to an UL reference signal from the UE. A call-flow of this case is similar to the call-flow as illustrated in FIGS. 9A and 9B and as such is describe in reference to FIGS. 9A and 9B. In such a case, the RAN may send to the UE UL reference signal configuration information to configure the UE to transmit UL reference signals, as shown at 910 of FIGS. 9A and 9B. The UL reference signal configuration may indicate to the UE to transmit UL reference signal using specific resources (e.g., a random access procedure (RACH), sounding reference signal (SRS)). The RAN may also indicate when to transmit the UL reference signals, such as based on a periodicity. The RAN may configure the serving TRP for the UE along with all neighboring TRPs as the TRP monitoring set to monitor for the UL reference signal, as showing at 908 of FIGS. 9A and 9B. The UE may send, as shown at 912 of FIGS. 9A and 9B, one or more UL reference signals based on the based on the UL reference signal configuration received in 910. The TRPs of the TRP monitoring set receive the UL reference signal and perform measurements, such as signal strength or signal quality, on the received UL reference signal, as shown at 914 of FIGS. 9A and 9B. The TRP monitoring set may transmit these measurements to the network entity in an UL measurement report. The UL measurement report may be sent by the TRP monitoring set to the network entity periodically, or when certain criteria are met (e.g., event triggered), based on the configuration received by the TRP monitoring set at step 908. The network entity determines one or more TRPs of the TRP monitoring set may send one or more DL reference signals, such as a channel state information reference signal (CSI RS) or synchronization signals, to the UE and configures the one or more TRPs to transmit the one or more DL reference signals. The network entity, via the serving TRP, transmits to the UE, DL configuration information configuring the UE to measure DL reference signals, as shown at 902 of FIGS. 9A and 9B. The RAN may specify to the UE a measurement reporting trigger indicating when to perform DL measurement reporting. This trigger may be periodic, or event based, and may indicate reporting criteria, such as which measurement events (e.g., LTE A1, . . . A5, B1, etc., as specified in TS 36.331). The DL measurement configuration may also include a neighbor TRP list (NTL) including one or more TRP neighbors of the current serving TRP. The UE then performs measurements (e.g., SINR, RSRQ) of the DL reference signals, as shown at 906 of FIGS. 9A and 9B, based on the DL configuration information received at 902 and transmits the DL measurement report related to the measurements to the serving TRP, which may forward the DL measurement report to the A network entity. The network entity may then determine a new serving (target) TRP based on the UL and DL measurement reports received from the TRPs and initiate handover procedures, as shown at 916-920 of FIGS. 9A and 9B.

According to certain aspects of the present disclosure, UL reference signals may include SRS or RACH signals. SRS may be sent by the UE on demand or based on a configurable periodicity and may not include control information as the resources used to send the SRS identify the UE to the network. RACH may be sent to the UE to a specific TRP utilizing PRACH resources. RACH may contain limited control information and may be available at a configurable periodicity.

According to certain aspects of the present disclosure, UEs may be connected to more than one TRP at a time. Where a UE is connected to multiple TRPs, the UE may already be connected to a target TRP in certain handover cases. In such cases, the source TRP is dropped and handover to the target TRP proceeds as usual.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for means for receiving, from a user equipment (UE), an indication of a category of the UE, wherein the category of the UE indicates at least one of: a maximum throughput supported by the UE or a number of layers supported by the UE may be a receiver of the eNB, for example, which may include antenna(s) 234a-234t, demodulator(s) 232a-232t, MIMO Detector 236, and/or Receive Processor 238 of the base station 110 illustrated in FIG. 2. Means for assuming a number of receivers at the UE based on the category of the UE and means for determining one or more transmit parameters based on the number of receivers of the UE may be a processing system of the eNB, for example, which may include Controller/Processor 240 and/or Scheduler 246 of the base station 110 illustrated in FIG. 2. Means for communicating with the UE according to the one or more transmit parameters may be a transmitter of the eNB, for example, which may include the antenna(s) 234a-234t, Modulator(s) 232t-232t, TX MIMO Processor 230, and/or Transmit Processor 220 of the base station 110 illustrated in FIG. 2.

Means for sending, to a base station (BS), an indication of a category of the UE, wherein the category of the UE indicates at least one of: a maximum throughput supported by the UE or a number of layers supported by the UE may be a transmitter of the UE, for example, which may include antenna(s) 252a-252r, modulator(s) 254a-254r, TX MIMO Processor 266, and/or Transmit Processor 264 of the UE 120 illustrated in FIG. 2. Means for receiving one or more transmissions, from the BS, transmitted according to one or more transmit parameters determined based on an assumption by the BS of a number of receivers at the UE may be receiver of the UE, for example, which may include antenna(s) 252a-252r, Demodulator 254a-252r, MIMO Detector 256, and/or Receive Processor 258 of the UE 120 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving one or more downlink (DL) reference signals from each of a plurality of transmission reception points (TRPs) of a radio access network (RAN) in a wireless communications network, wherein the UE is operating in a connected state with each of the plurality of TRPs, and wherein one of the plurality of TRPs acts as a serving TRP for the UE;
measuring the one or more DL reference signals of each of the plurality of TRPs;
transmitting, to the serving TRP, a first measurement report indicative of the measurements of the one or more DL reference signals of each of the plurality of TRPs, wherein a subset of the plurality of TRPs is selected by the RAN based on the first measurement report as received by the serving TRP;
transmitting, to the subset of the plurality of TRPs, one or more uplink (UL) reference signals, wherein the subset of the plurality of TRPs measure the one or more UL reference signals; and
receiving a request to handover from the serving TRP to one or more TRPs of the subset of the plurality of TRPs, wherein the handover request is based on, at least in part, the measurements of the one or more UL reference signals by the subset of the plurality of TRPs and the first measurement report transmitted to the serving TRP.

2. The method of claim 1, further comprising:
receiving, from the serving TRP, UL configuration information related to the one or more UL reference signals, wherein the one or more UL reference signals are transmitted in accordance with the UL configuration information.

3. The method of claim 2, wherein:
receiving the UL configuration information is in response to sending the first measurement report.

4. The method of claim 2, wherein the UL configuration information is received as at least one of a radio resource control (RRC) configuration or a scheduling configuration.

5. The method of claim 2, further comprising:
receiving a configuration message wherein the configuration message comprises DL measurement configuration information related to receiving the one or more DL reference signals of each of the plurality of TRPs and the UL configuration information.

6. The method of claim 2, wherein the UL configuration information comprises criteria for sending the one or more UL reference signals.

7. The method of claim 1, wherein:
the first measurement report is transmitted based on the UE determining measurements of the one or more DL reference signals of each of the plurality of TRPs satisfy one or more criteria; and
the one or more UL reference signals are transmitted in response to the UE determining measurements of the one or more DL reference signals of each of the plurality of TRPs satisfy one or more criteria.

8. The method of claim 7, wherein the criteria involves a comparison of the measured one or more DL reference signals of each of the plurality of TRPs and one or more threshold values.

9. The method of claim 1, wherein the one or more UL reference signals comprise a random access procedure (RACH) or a sounding reference signal (SRS).

10. The method of claim 1, wherein the one or more DL reference signals of each of the plurality of TRPs comprise one or more of a channel state information reference signal (CSI RS) or synchronization signals.

11. The method of claim 10, wherein the one or more DL reference signals of each of the plurality of TRPs comprise one or more transmission reception point identifiers (TRP-IDs) identifying the plurality of TRPs.

12. A method for wireless communication by a serving transmission reception point (TRP) of a radio access network (RAN), comprising:
- transmitting, to a user equipment (UE), one or more downlink (DL) reference signals, wherein the UE is operating in a connected state with each of a plurality of TRPs of the RAN, wherein one of the plurality of TRPs is the serving TRP;
- receiving, from the UE, a first measurement report indicative of measurements of one or more DL reference signals of each of the plurality of TRPs, wherein a subset of the plurality of TRPs is selected by the RAN based on the first measurement report as received by the serving TRP;
- receiving, from the UE, one or more uplink (UL) reference signals;
- measuring the one or more UL reference signals; and
- transmitting a request for the UE to handover from the serving TRP to one or more TRPs of the subset of the plurality of TRPs based, at least in part, on measurements of the one or more UL reference signals by the subset of the plurality of TRPs and the first measurement report.

13. The method of claim 12, further comprising transmitting, to the UE, configuration information related to the one or more UL reference signals.

14. The method of claim 13, wherein the configuration information is transmitted to the UE to trigger transmission of the one or more UL reference signals in response to the UE determining that the measurements of the one or more DL reference signals of each of the plurality of TRPs from the first measurement report satisfy one or more criteria.

15. The method of claim 14, wherein the criteria involves a comparison of the measured one or more DL reference signals of each of the plurality of TRPs and one or more threshold values.

16. The method of claim 12, wherein the one or more UL reference signals comprises a random access procedure (RACH) or a sounding reference signal (SRS).

17. The method of claim 12, wherein the one or more DL reference signals of each of the plurality of TRPs comprise one or more of a channel state information reference signal (CSI RS) or synchronization signals.

18. The method of claim 17, wherein the one or more DL reference signals of each of the plurality of TRPs comprise one or more transmission reception point identifiers (TRP-IDs) identifying the plurality of TRPs.

\* \* \* \* \*